United States Patent [19]

Banks, Jr.

[11] 4,395,840
[45] Aug. 2, 1983

[54] TELESCOPING LURE DEHOOKER

[76] Inventor: Holly Banks, Jr., 4046 Saint Monica Dr., Baltimore, Md. 21222

[21] Appl. No.: 286,066

[22] Filed: Jul. 23, 1981

Related U.S. Application Data

[63] Continuation-in-part of Ser. No. 111,119, Jan. 10, 1980, abandoned.

[51] Int. Cl.³ .................. A01K 97/00; A47F 13/06
[52] U.S. Cl. ............................... 43/17.2; 294/19 A
[58] Field of Search .............. 43/17.2, 24; 16/115; 294/19.1, 19.2

[56] References Cited

U.S. PATENT DOCUMENTS

| | | | |
|---|---|---|---|
| 2,083,814 | 6/1937 | Bence | 43/17.2 X |
| 2,467,269 | 4/1949 | Miller | 43/17.2 |
| 2,948,077 | 8/1960 | Karpes | 43/17.2 |
| 2,950,558 | 8/1960 | Karpes | 43/17.2 |
| 4,086,718 | 5/1978 | Swanson et al. | 43/17.2 |
| 4,325,157 | 4/1982 | Balint et al. | 16/115 |

Primary Examiner—Nicholas P. Godici
Assistant Examiner—Jerold L. Johnson
Attorney, Agent, or Firm—John F. McClellan, Sr.

[57] ABSTRACT

A dehooker for fishing lures includes a bifurcate offset terminal portion for prying loose hooks, supported by a telescoping assembly with a handle; snap eyes on the respective telescoping sections permit detachable attachment to a fishing line in either extended or collapsed configuration, depressable-release locking springs secure the dehooker in extended mode; the bifurcate tip portion is adjustable in rotation about the axis by means of screw attachment and jam nut; quick substitution of another type dehooker terminus as needed is simply done using this screw and nut provision.

5 Claims, 15 Drawing Figures

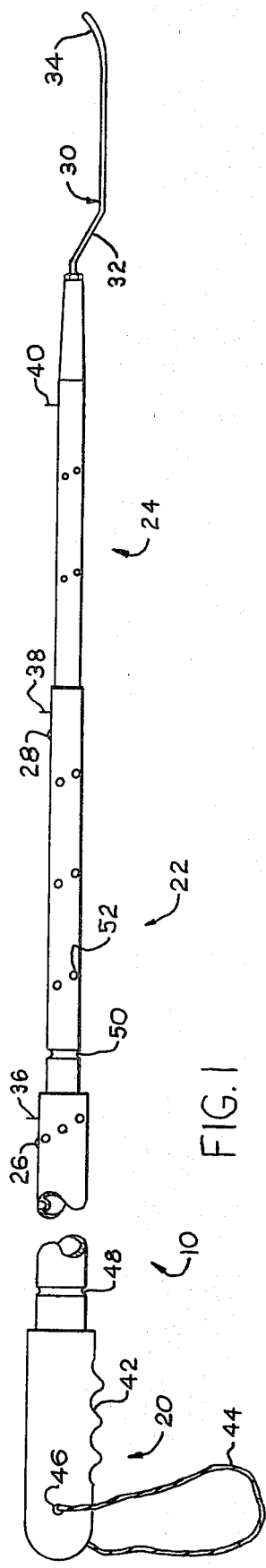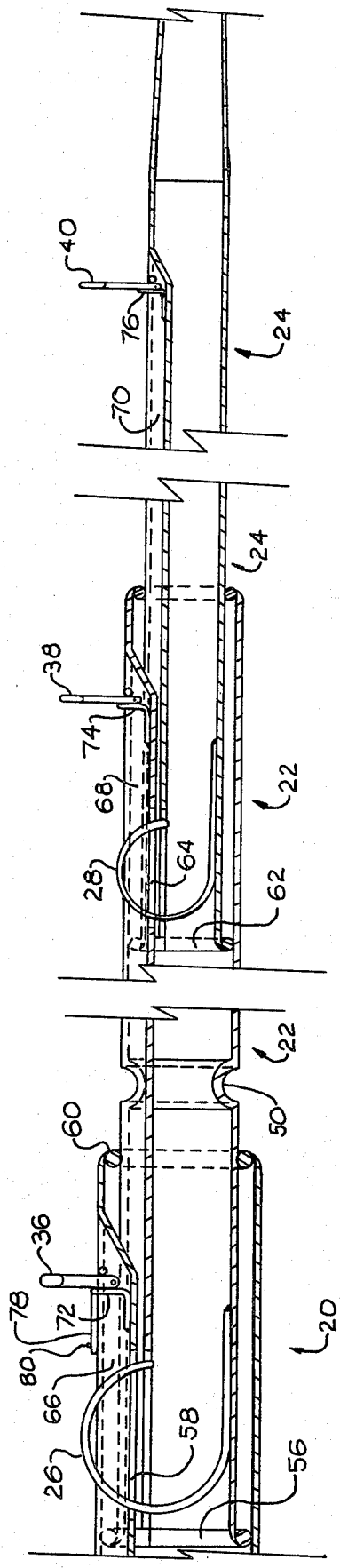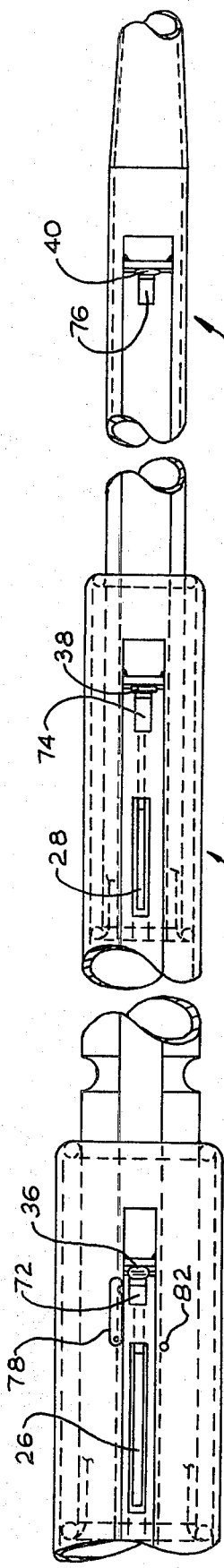

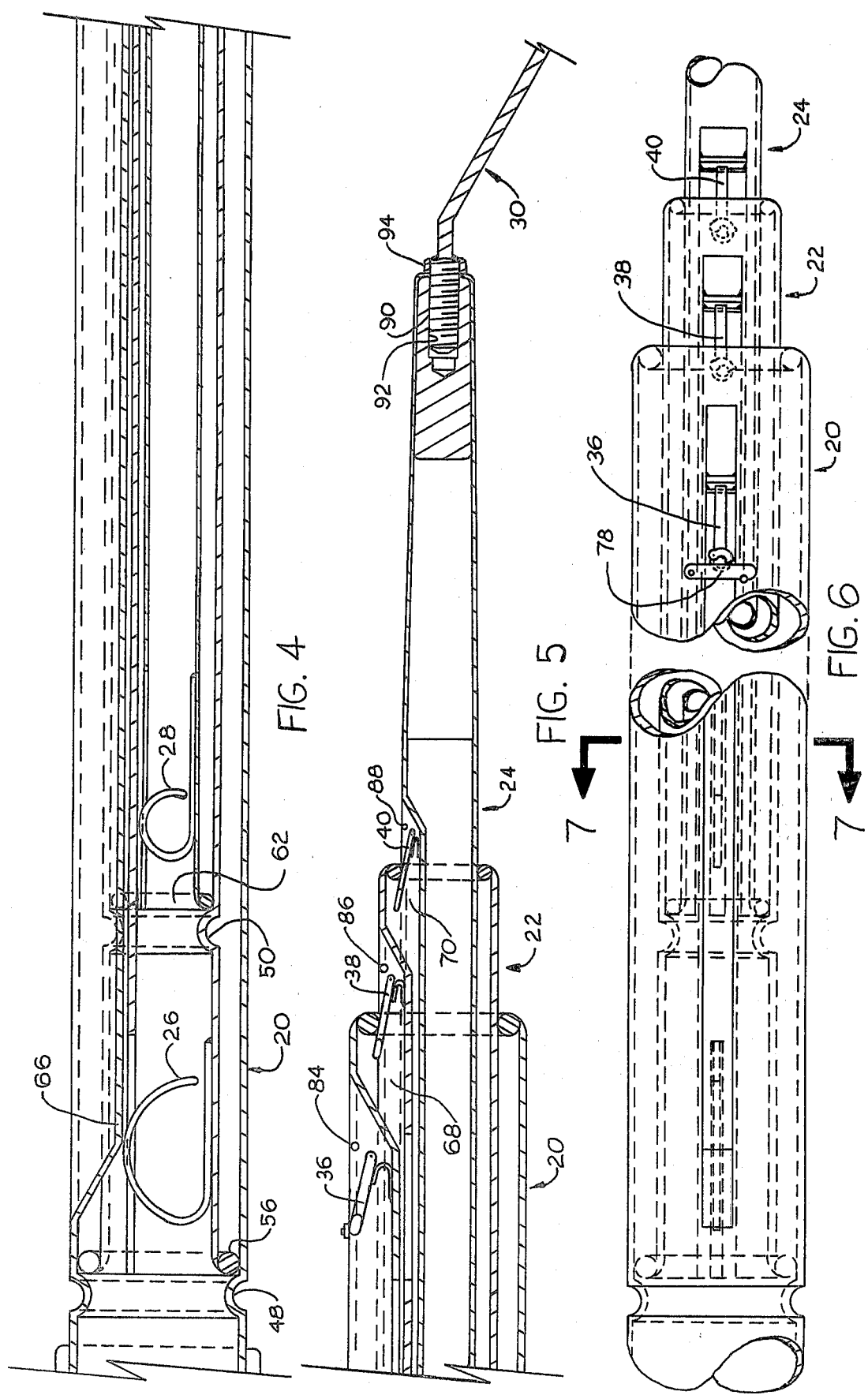

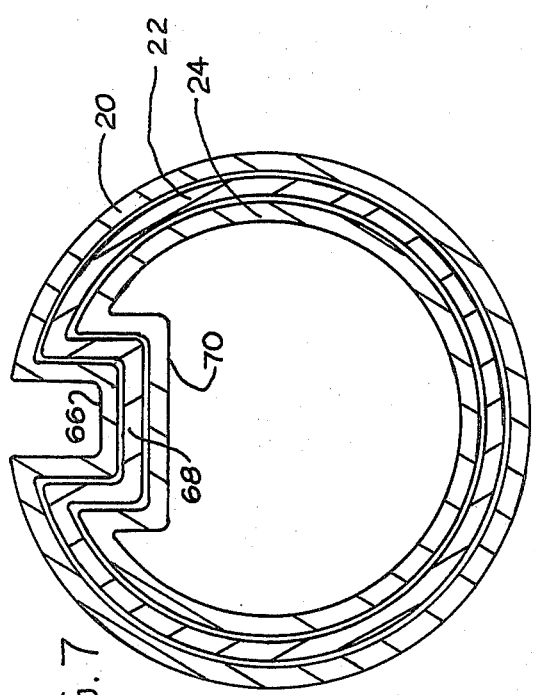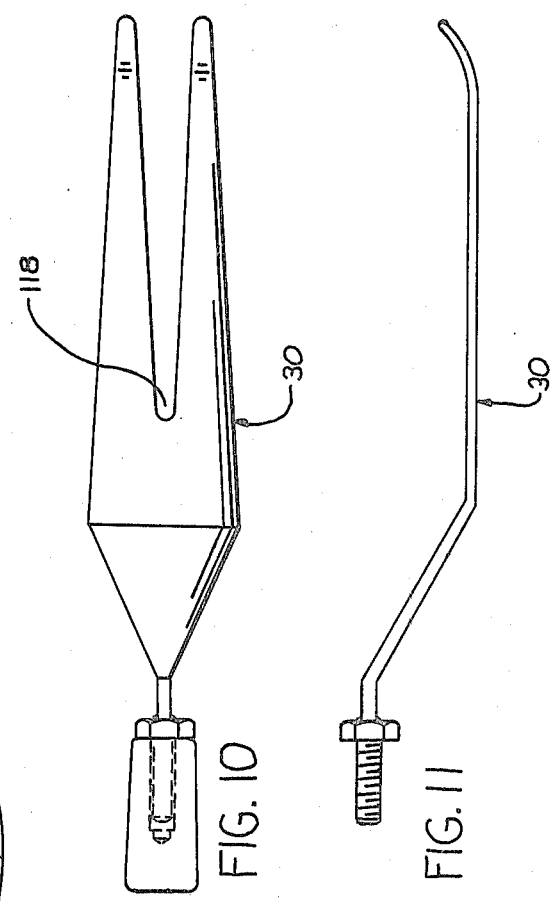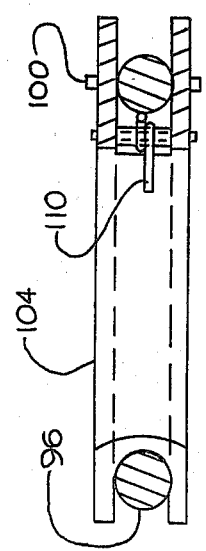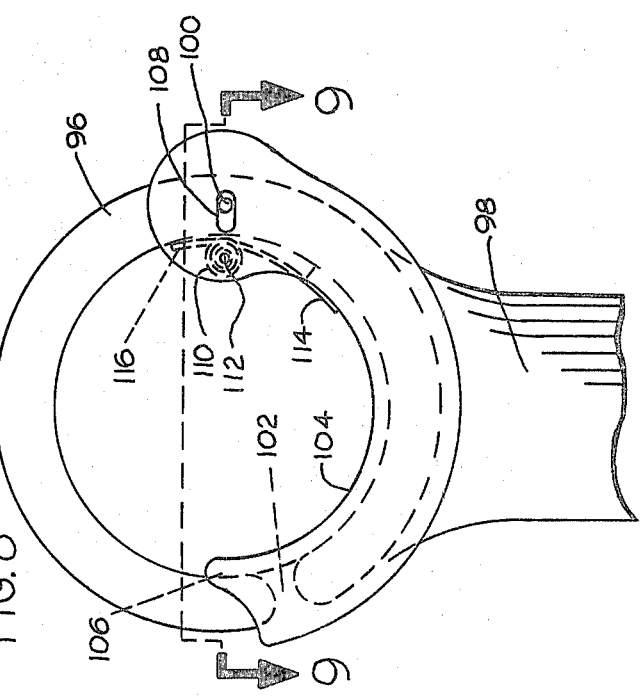

4,395,840

TELESCOPING LURE DEHOOKER

CROSS REFERENCE TO CO-PENDING APPLICATION

This application is a continuation-in-part of my co-pending application, Ser. No. 06/111,119, filed Jan. 10, 1980 and abandoned on filing the present application.

FIELD OF THE INVENTION

This invention relates generally to equipment for fishermen and particularly to a de-hooker for lures.

PRIOR ART

One of the frequent problems in fishing is the retrieval of a lure from a snagged position on brush or underwater obstacles such as aquatic weeds or submerged stumps, logs and the like. To remedy the problem of remote retrieval of objects, various disclosures have been made in the prior art, as exemplified by the following U.S. Pat. Nos.:

2,834,629 employs a telescoping rod for golf ball retrieval;

3,046,044 is another form of the above;

3,157,422 has a fork at the end as does this invention; the fork springs open and shuts around objects to be recovered;

3,311,398 discloses an extensible gaff with handle holding mechanism.

However, it is believed that none of the prior art devices supplies all the advantages of the present invention as set forth in the objects below.

OJBECTS OF THE INVENTION

Principal objects of this invention are to provide a de-hooker for lures which is at the same time efficient at unhooking snagged lures and retrieving them, which collapses for easy carriage but which is easily and positively extensible, which is light in weight, economical to manufacture and to purchase, and which is attractive in appearance.

BRIEF SUMMARY OF THE INVENTION

In brief summary given as cursive description only and not as limitation the invention includes a telescoping rod assembly terminating at one end in a sling-provided hand-grip and at the other end in an interchangeable fork of special shape for stabilizing and prying on a lure, and having along the top means for quick, detachable attachment to a line to guide it to, and align it with a snagged lure.

BRIEF DESCRIPTION OF THE DRAWINGS

The above and other objets and advantages of this invention will become more readily understood on examination of the following description, including the drawings in which like characters denote like parts:

FIG. 1 is a side elevational view of the invention in fully extended position;

FIGS. 2a, 2b and 2c are side elevational view sectional fragmentary details;

FIGS. 3a, 3b and 3c are plan view details respectively corresponding to FIGS. 2a, 2b and 2c;

FIG. 4 is a side elevational sectional view detail of a folded position;

FIG. 5 is a side elevational sectional view detail of a folded position;

FIG. 6 is a plan view detail of a folded position;

FIG. 7 is a cross sectional view taken at 7—7, FIG. 6;

FIG. 8 is a front elevational view detail of a line guide;

FIG. 9 is a sectional view taken at 9—9, FIG. 8;

FIG. 10 is a plan view detail; and

FIG. 11 is a side elevational view detail.

DETAILED DESCRIPTION OF THE DRAWINGS

FIG. 1 shows the invention 10 deployed for use. Shown are at least three axial, slidably telescoping sections: generally cylindrical butt section 20, generally cylindrical mid-section 22, and tip section 24 which tapers down at the end. The sections may be of brass or aluminum, the tip section being solid for weight and the other sections tubular.

Protrusion of a depressable loop 26, 28 of a locking spring through a respective slot in each of the first two sections, the butt section and mid-section, locks the dehooker in this extended mode.

The extreme tip comprises a bifurcate member or offset fork 30 generally parallel with the axis but having a first or downward offset 32 where it joins the tip section and a second, upward or return offset 34, at the end of the middle portion which is offset parallel with the axis.

Each section has at the forward end on top a snap eye 36, 38, 40, each oriented transverse to the axis, for detachable sliding affixation to a fishing line so that the fishing line can be followed down to a snagged lure by the de-hooker, for efficient location of the snagged lure.

This section-end location of the snap eyes permits the de-hooker to be attached to a fishing line while the de-hooker is in a collapsed condition, making the line-attaching job much more convenient and sure. After this attaching the de-hooker sections can successively and more safely be extended, ending with the butt section in hand.

The butt section preferably has a series of handgrip contours or convolutions 42 for fitting between the fingers to prevent slipping when wet, and a loop 44 of flexible line for engaging the user's wrist for further security is affixed through a hole 46 in the butt.

Grooves 48, 50, are formed circumferential indentations in the respective butt and middle sections to limit collapsing travel when telescoping the sections and prevent damage to the respective locking springs. Open ports 52 in the respective sections offset buoyancy so that the de-hooker can follow under water without application of undue force, and provide for drainage.

FIGS. 2a, 2b and 2c show in side elevational partially sectional detail typical interfit of respective sections. With "J" spring 26 compressed, middle section 22 telescopes into butt section 20 until the leading end strikes the annular groove structure in the butt section (groove 48, FIG. 1), in folding. For telescoping to extended configuration, middle section 22 can be slid partially out of the butt section, stopping when the outward-rolled-end 56 approaches "J" spring 26, fixed in the middle section, which spring then engages butt-section slot 58 and fixes the extended positon of the middle section 22 relative to the butt section 20.

Inward-rolled end 60 at the front on the butt section compensates the fit of the middle section outward-rolled-end 56, stabilizing the sections.

Similarly, the tip section 24 telescopically slides in the middle section 22, stopping on collapsing when in the middle section outwardly-rolled-end 62 of the tip section strikes annular groove structure 50 of the middle section, and in the extension direction stops when "J" spring, 28, with straight leg welded or otherwise fixed in the tip section, enters slot 64 of the middle section.

All inwardly rolled-end members are continuous circles in endview. The butt, middle and tip sections, have respective top longitudinal formed-grooves defined by respective channel sections 66, 68, 70 which interfit to prevent rotation of the three sections relative to each other.

Each of the line guides 36, 38, 40 has an angled flat spring 72, 74, 76 with one end anchored to a section, for holding the line guides upright.

The butt section line guide additionally has a hold-down tab 78 pivoted to the butt section at 80. The other line guides are held down by the telescoping of parts.

FIGS. 3a, 3b and 3c show plan details of portions of the butt section 20, middle section 22, and tip section 24 corresponding to those of FIGS. 2a, b, c. Stop 82 limits travel of tab 78.

FIG. 4 shows the telescopically collapsed relation of portions of the butt section with "J" spring 26 of middle section held down by the butt section longitudinal groove structure 66 and outward-rolled end 56 resting against butt-section annular groove structure 48.

Similar relations are shown for tip section "J" spring 28 and tip section outward rolled end 62 and middle section annular groove structure 50.

FIG. 5 details the folded relation of the line guides 36, 38, 40, the latter two of which are held folded by insertion into the respective butt section 20 and middle section 22. Location of the line guides at the bottom of the structures 68, 70 forming the longitudinal grooves in the middle and tip sections makes this possible. Stops 84, 86, 88 limit upward travel of the respective line guides.

Also visible is threaded shank 90 on the fork structure 30 engaging a threaded socket 92 in a solid end portion of the tip section, with jam nut 94 permitting locking the fork in any selected rotational position about the axis of the tip section, for versatility in prying-loose plugs and other snagged lures. Together with the offset of the bifurcate portion this reorientation permits prying in any direction on a snagged lure in the manner of the claws of a claw hammer to free it efficiently and glide it over snags.

The threaded connection permits ready substitution of other types of lure-engaging tip also.

FIG. 6 shows in plan detail the folded relations of the line guides 36, 38, 40, with the butt section tab 78 holding down line guide 36.

FIG. 7 shows cross-sectional relation of the longitudinal groove structure 66, 68, 70 of the butt section 20, middle section 22 and tip section 24 respectively. The sections are held in proper torsional relation by the longitudinal groove structures regardless of whether the "J" springs are engaged.

FIG. 8 shows a preferred typical line guide, snap-ring or snap-eye 36 construction. Eye 96 may be in the shape of a circular hook. It has shank 98 integrally extending down from it for pivotal attachment to a section as indicated above. Pivoted to the eye at 100, opposite eye opening 102, is a semicircular gate 104 which is inside the eye and can be inwardly pivoted or swung open in an upward direction enough to permit passage of a bight of line into or out of the eye in clearance 106 between the gate and eye. The line access clearance is shown as small but for heavy lines should be greater. The gate may be slotted at the pivot as at 108 to provide greater clearance on opening. Open coil spring 110 will yield toward the slot.

Coil spring 110 on pin 112 in the gate has one leaf 114 pressing on the gate and one leaf 116 pressing on the eye, biasing the gate closed. The gate preferably has a "U"-shaped crosssection for better holding on the eye under stresses of lure dislodgement.

FIG. 9 shows sectional relations of eye 96 with gate 104, spring 110 and pivot 100.

FIGS. 10 and 11 show in plan and in elevational views preferred shape of the lure-prying fork 30, including the inwardly narrowing fork opening 118 for easy access to a lure but tighter grip when prying, and the smoothly angled, nonsnagging fork contour.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. A dehooker for fishing lures comprising a rod assembly having at least the following telescoping sections in axial relation: a butt section, a middle section slidably connecting with the butt section, a tip section slidably connecting with the middle section; a bifurcate member on the end of the tip section; means for detachably attaching the dehooker for sliding along a fishing line, means for holding all said sections in extended configuration, an offset portion on the end of the bifurcate member for acting in the manner of the claw of a claw hammer for prying loose snagged lures, means for fixing the bifurcate member in any orientation about said axis, the means for fixing including the tip secton having a threaded hole therein, a threaded shank on said bifurcate member for screwing into said threaded hole and a jam nut on the threaded shank for fixing the orientation thereof in said threaded hole; the rod assembly having longitudinal formed-groove structure along the top thereof for maintaining all said sections in orientation about said axis, the means for detachably attaching the dehooker comprising a respective snap eye in said longitudinal formed-groove structure on an end of each of said sections for aligning the dehooker with snagged fishing lures, and each said snap eye having a pivotal arm for opening a line access aperture in the snap eye.

2. A dehooker for fishing lures comprising a rod assembly having at least the following telescoping sections in axial relation: a butt section, a middle section slidably connecting with the butt section, a tip section slidably connecting with the middle section; a bifurcate member on the end of the tip section; means for detachably attaching the dehooker for sliding along a fishing line, means for holding all said sections in extended configuration, an offset portion of the bifurcate member on the end of the tip section for acting in the manner of the claw of a claw hammer for prying loose snagged lures, the means for detachably attaching the dehooker including a respective snap eye on an end of each of said sections for aligning the dehooker with snagged fishing lures, each said snap eye having an inwardly pivoting arm for providing a line access opening in the snap eye, and means for folding each said snap eye.

3. A dehooker as recited in claim 2, the means for holding all said sections in extended configuration comprising at least one locking spring generally in "J" shape with a circular portion thereof positioned for engaging a slot in one of said sections.

4. A dehooker as recited in claim 3, the butt-section having slip-preventing handgrip structure.

5. A dehooker as recited in claim 4, and a line loop on the butt section for engaging a user's wrist.

* * * * *